Aug. 19, 1924.

F. T. BURNS 1,505,541

CENTER GAUGE

Filed March 6, 1922

Inventor
Fred T. Burns
By Ralymond A Parker
Attorney

Patented Aug. 19, 1924.

1,505,541

UNITED STATES PATENT OFFICE.

FRED T. BURNS, OF DETROIT, MICHIGAN.

CENTER GAUGE.

Application filed March 6, 1922. Serial No. 541,516.

*To all whom it may concern:*

Be it known that I, FRED T. BURNS, a citizen of the United States, residing at Detroit, in the county of Wayne and State of Michigan, have invented certain new and useful Improvements in Center Gauges, of which the following is a specification.

My invention relates to improvements in center gauges.

The object is to provide a simple, inexpensive center gauge adapted for use in the accurate, ready setting of a tool in lathe work. It is particularly adapted to be used in connection with the positioning of a thread cutting tool to approach a piece of work at a perpendicular thereto, and is easy and simple of operation and accurate.

Figure 1:
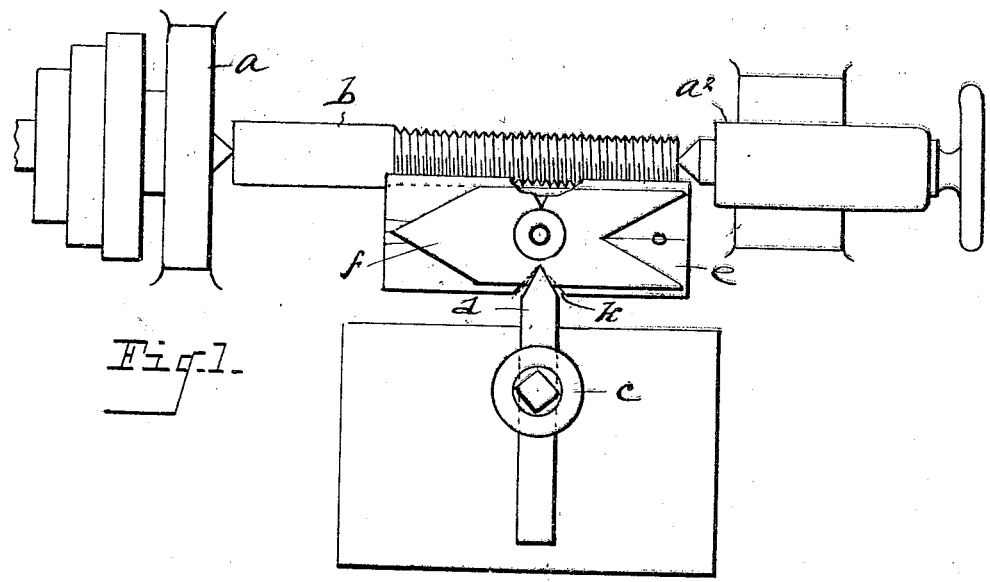
Fig. 1 is a plan showing my gauge applied to a threaded piece of work positioned between opposed lathe centers.

In the drawings, $a$ and $a^2$ indicate opposed lathe centers carrying a threaded piece of work $b$. The tool post is $c$ and a tool carried thereby is indicated as $d$.

My gauge comprises a base plate $e$ provided with a grooved straight edge $g$ and having a reading line $h$, which has a determined angular relationship with the straight edge, and is here shown as parallel thereto. Additional reading lines might be provided as desired. Two lines $h^2$ and $h^3$ are here shown, which intersect the line $h$ at the pivot point of the pointer. The base plate might be provided with a straight edge at either or both ends if desired.

Pivoted to the base is an indicator or pointer $f$, provided with tool receiving notches $i$ and $i^2$ of varying size, said notches being so formed and so positioned on the indicator that when a tool is centered therein, and the indicator registers at its pointed end $f^2$ on the reading line $h$, the tool will be positioned perpendicular relative to the work, provided the straight edge of the pointer is placed against the work as indicated in Fig. 1. With one hand the workman can easily hold the gauge against the work leaving the other hand free to adjust the tool. The V-groove in the straight edge when engaged with the work will secure the base of the gauge against displacement relative to the work. The comparatively greater length of the reading radius of the indicator over the radius on which tool actuates the indicator insures sufficient movement of the indicator at the reading end to distinguish slight angular movement of the tool in its adjustment. The indicator is pivoted to the base by means of a bolt $e^2$ having a thumb nut $e^4$.

Figures 2, 3:
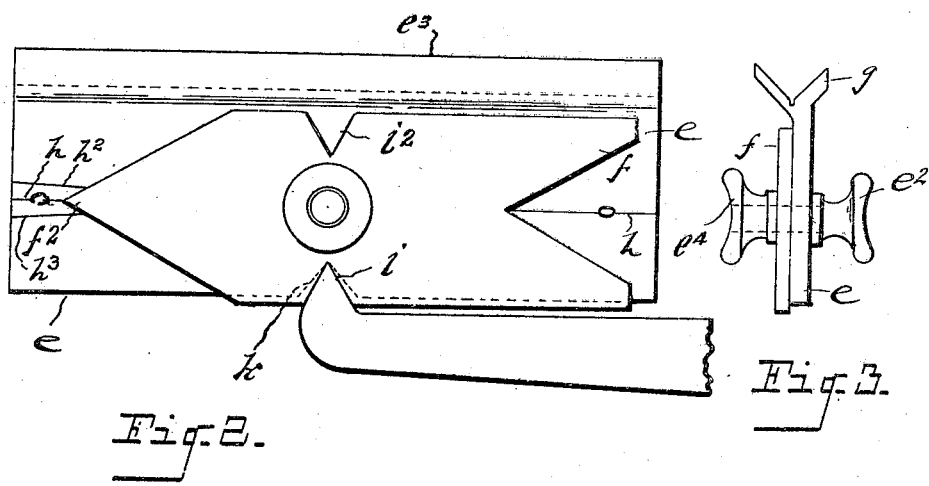
Fig. 2 is a plan of the gauge, slightly modified in construction, and used with a different kind of tool.
Fig. 3 is an end view of the gauge.

A slight modification of the structure is shown in Fig. 2, in which the pointer is of such a width as to extend beyond the edge of the base opposite the straight edge thereof, so as to permit a tool such as shown in such figure, which is a tool used for cutting internal threads, to lie alongside the pointer overlapping the base, without contracting the base. In Fig. 1 the base is shown as cut away at $k$ immediately underneath the notch $i$, and oversize the notch, to permit free movement of the tool when centered in the notch $i$. Of course it is apparent that it is not entirely necessary to so cut away the base as the tool could be inserted in the notch in the indicator above the base plate but the tool would not be so securely engaged with the indicator notch in such case and generally the tool with which this gauge is used is of a thickness considerably in excess of the thickness of the indicator.

What I claim is:

1. In a tool gauge, the combination with a base plate forming a straight edge and having a reading line formed on the surface of the plate, of an indicator pivoted to the base plate having a pointer at one end substantially remote from its pivot point, and a notch in substantial proximity to its pivot point, which notch is adapted to receive the end of the tool, said notch and pointer so relatively disposed that when the pointer registers on the reading line a radius to the pivot perpendicular to the straight edge passes through the apex of the notch.

2. In a tool gauge, in combination, a base plate forming a straight edge and having a reading line, an indicator pivoted to said base plate having a pointer at one end adapted to register with said reading line, said indicator being provided with a notch to receive the end of a tool, said notch and pointer being so positioned relative to the pivot of the indicator that the distance from the pointer to the pivot is substantially greater than the distance from the apex of the notch to the pivot.

FRED T. BURNS.